United States Patent
Komai et al.

[11] Patent Number: 5,093,407
[45] Date of Patent: Mar. 3, 1992

[54] CARBON BLACKS AND RUBBER COMPOSITIONS CONTAINING THE CARBON BLACKS

[75] Inventors: Yasumi Komai, Ichihara; Mizuo Soeda, Taito, both of Japan

[73] Assignee: Cabot Corporation

[21] Appl. No.: 579,659

[22] Filed: Sep. 10, 1990

[30] Foreign Application Priority Data

Sep. 14, 1989 [JP] Japan .................................. 1-238740
Jun. 26, 1990 [JP] Japan .................................. 2-167289

[51] Int. Cl.$^5$ ...................... C01B 31/00; C01B 31/02; C09C 1/48; C08K 3/04
[52] U.S. Cl. .................................. 524/495; 423/445; 423/449; 423/450
[58] Field of Search ............... 423/445, 450, 449; 524/495

[56] References Cited

U.S. PATENT DOCUMENTS

| | | | |
|---|---|---|---|
| 4,246,251 | 1/1981 | Braddock | 423/445 |
| 4,477,621 | 10/1984 | Sato et al. | 524/495 |
| 4,500,672 | 2/1985 | Suzuki et al. | 423/445 |
| 4,548,980 | 10/1985 | Nagata et al. | 524/495 |
| 4,678,830 | 7/1987 | Sato et al. | 524/495 |
| 4,784,695 | 11/1988 | Mito et al. | 423/450 |
| 4,973,463 | 11/1990 | Nakai | 423/445 |

FOREIGN PATENT DOCUMENTS

| | | | |
|---|---|---|---|
| 3002555 | 1/1981 | Fed. Rep. of Germany | 423/445 |
| 1355872 | 3/1963 | France | 423/445 |
| 47263 | 3/1984 | Japan | 423/445 |
| 71367 | 4/1984 | Japan | 423/445 |
| 34072 | 2/1986 | Japan | 423/445 |
| 277446 | 12/1987 | Japan | 423/445 |
| 2151604 | 7/1985 | United Kingdom | 423/445 |

*Primary Examiner*—Wayne Langel
*Attorney, Agent, or Firm*—L. A. Chaletsky

[57] ABSTRACT

Carbon blacks having a $N_2SA$ of from at least about 150 $m^2/g$ to about 180 $m^2/g$, a DBP of about 125 cc/100 g or less, a Dmode of 70 nm or less, a $N_2SA/I_2$ No. ratio of 0.85 to 0.98 and a $\Delta DBP$ less than 210 cc/100 g which, when incorporated into rubber compositions, impart increased abrasion resistance, heterogenous abrasion resistance and grip performance properties. Also disclosed are rubber composition incorporating the novel carbon blacks.

4 Claims, 2 Drawing Sheets

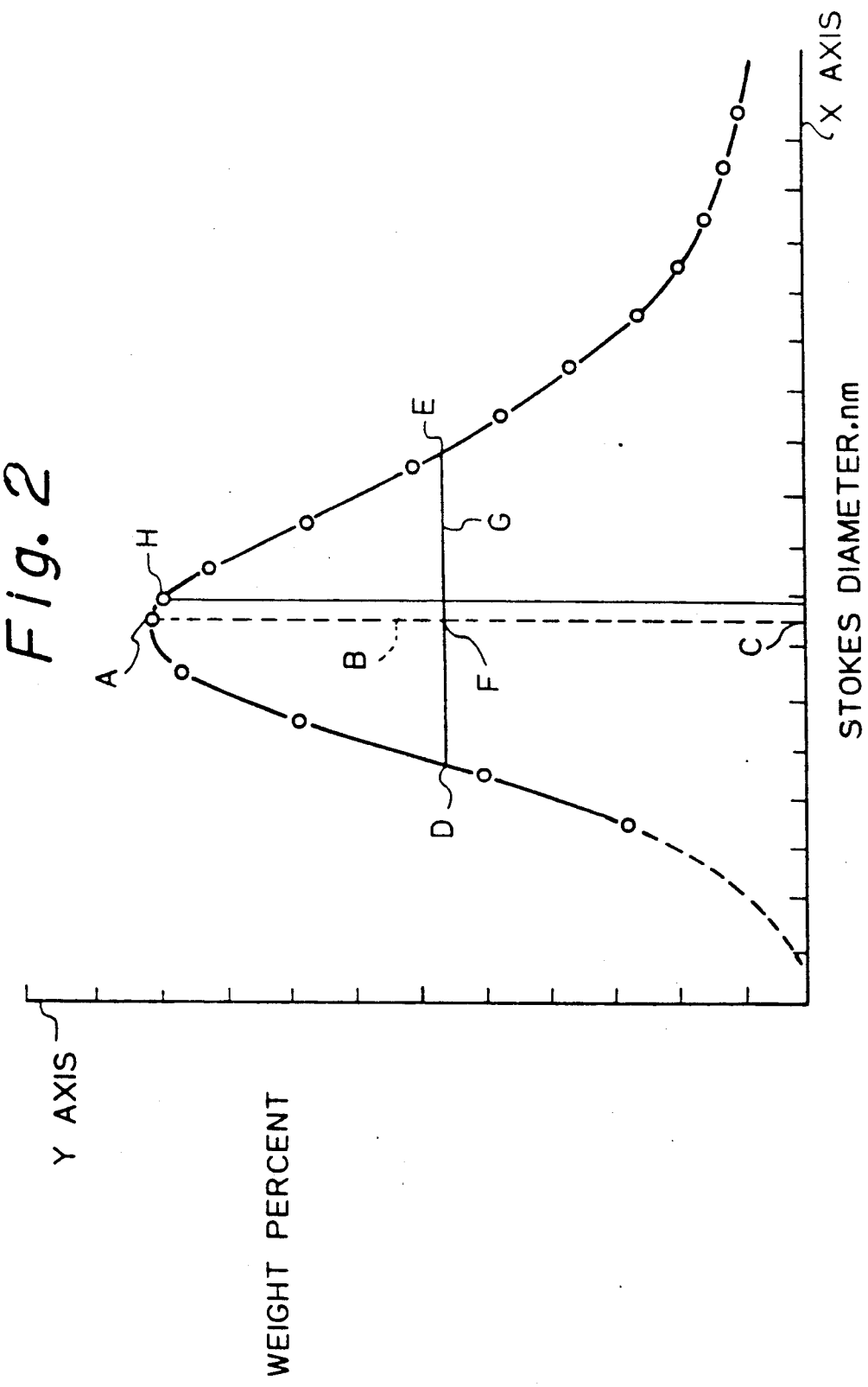

CARBON BLACKS AND RUBBER COMPOSITIONS CONTAINING THE CARBON BLACKS

FIELD OF THE INVENTION

The present invention relates to a class of novel furnace carbon blacks which are suitable for various applications and particularly well suited for use in rubber compositions. More particularly the present invention relates to a class of novel carbon blacks which impart improved abrasion resistance, heterogeneous abrasion resistance and grip performance (traction) properties to rubber compositions in which the carbon blacks are incorporated.

BACKGROUND

Carbon blacks are generally produced in a furnace-type reactor by pyrolyzing a hydrocarbon feedstock with hot combustion gases to produce combustion products containing particulate carbon black.

Carbon blacks may be utilized as pigments, fillers, reinforcing agents and for a variety of other applications. For example, carbon blacks are widely utilized as fillers and reinforcing pigments in the compounding and preparation of rubber compositions.

Carbon blacks for rubber use have a variety of grades depending upon their properties and are generally classified on the basis of analytical properties including: specific surface area (iodine adsorption ($I_2$ No.); nitrogen surface area ($N_2SA$, etc.), structure (DBP absorption) and the like. Methods of measuring the surface area of carbon black include an electron microscope, nitrogen surface area ($N_2SA$) according to the BET method, CTAB surface area according to the adsorption of cetyltrimethylammonium bromide as a surfactant, and iodine adsorption number ($I_2$ No.). The structure of a carbon black refers to the linkage of carbon black particles due to agglomeration. As the degree of agglomeration becomes greater, the value of this structure becomes higher.

The properties of the grade of carbon black become an important factor in determining various performances of the rubber composition wherein the carbon blacks are incorporated. Carbon blacks are effective in the preparation of rubber vulcanizates intended for usage in preparing tires. It is generally desirable in the production of tires to utilize carbon blacks which produce tires with high levels of abrasion resistance, heterogeneous abrasion resistance and grip performance properties. These properties are especially important in racing tires.

The relationship between heterogeneous abrasion resistance and carbon black properties is not well understood. However, generally, in order to impart high abrasion resistance a carbon black having both a high surface area and a high degree of structure is incorporated into the rubber composition used to form the tire. Generally a high $N_2SA$ carbon black is also useful for improving the grip performance properties of tires into which the carbon black is incorporated.

However, a carbon black having a high specific surface area is generally believed to impart a high viscosity during the mixing step in the formation of a rubber compound. This high viscosity causes the dispersion of the carbon black into the rubber compound to deteriorate, and may thereby adversely affect abrasion resistance and heterogeneous abrasion resistance of the rubber compound. Thus, when carbon blacks having a high surface area are added during the process of forming rubber compositions the high surface area carbon blacks make the rubber composition more difficult to mix. The high surface area carbon blacks are also more difficult to disperse in rubber compositions. Further, when carbon blacks having a high degree of structure are incorporated into rubber compositions, the hardness of the rubber composition becomes unsuitable.

It would be desirable to develop a carbon black which would impart improved abrasion resistance, heterogeneous abrasion resistance and grip performance properties to rubber compositions containing the carbon black. Tires prepared with such a carbon black would be especially advantageous for use as racing tires.

Accordingly, one object of the present invention is the production of new carbon blacks which impart improved abrasion resistance, heterogeneous abrasion resistance and grip performance properties to natural rubbers, synthetic rubbers and blends of natural and synthetic rubbers incorporating the carbon blacks.

Another object of the present invention is new rubber compositions, advantageous for use in producing tires, particularly racing tires, incorporating the new carbon blacks.

Other objects of the present invention will become apparent from the following description and the claims.

SUMMARY OF THE INVENTION

We have discovered a new class of carbon blacks having a nitrogen surface area ($N_2SA$) of from at least about 150 $m^2/g$ (square meters/gram) to about 180 $m^2/g$, a DBP (dibutyl phthlate absorption number) of about 125 cc/100 g (cubic centimeters per 100 grams) or less, a Dmode of 70 nm (nanometers) or less, a ratio of $N_2SA$ to $I_2$ No. (iodine adsorption number) ($N_2SA/I_2$ No.) of 0.85 to 0.98 and a $\Delta DBP$ (DBP — Crushed DBP (CDBP)) less than 20 cc/100 g. Preferably the carbon blacks of the present invention have a DBP of 100–125 cc/100 g, a Dmode of 50–70 nm and a $\Delta DBP$ of from 10–20 cc/100 g. We have also discovered a new class of rubber compositions containing these carbon blacks.

Referring to the present invention, it has been found that when the $N_2SA$ of the carbon black is less than 150 $m^2/g$ the desired level of abrasion resistance cannot be obtained, and when the $N_2SA$ of the carbon black exceeds 180 $m^2/g$, the carbon black may cause mixing and dispersing problems during the formation of the rubber composition. Moreover, if the $N_2SA$ of the carbon blacks is between 150 $m^2/g$ and 180 $m^2/g$ but the DBP of the carbon blacks exceeds 125 cc/100 g the hardness of the rubber composition becomes unsuitably high. When the Dmode of the carbon black exceeds 70 nm the desired level of abrasion resistance cannot be obtained. A $N_2SA/I_2$ No. ratio measures the degree of surface modification of the carbon black and when this ratio exceeds 0.98, the abrasion resistance of a rubber composition incorporating the carbon black is not improved regardless of the high surface area of the carbon black. When the $\Delta DBP$ of a carbon black is 20 cc/100 g or greater, the required level of abrasion resistance, in a rubber composition incorporating the carbon black, generally cannot be obtained regardless of the structure level of the carbon black.

The carbon blacks of the present invention may be produced in a furnace carbon black reactor having a first (combustion) zone, and a reaction zone separated by a transition zone, into which all or part of a carbon black yielding feedstock may be injected into a hot combustion gas stream. The carbon black yielding feedstock is injected radially inwardly into the hot combustion gas stream from the outer periphery of the reactor and also radially outwardly injected from the center portion. The resultant mixture of hot combustion gases and feedstock passes into the reaction zone. Pyrolysis, of the carbon black yielding feedstock, is stopped by quenching the mixture when the carbon blacks of the present invention have been formed. Preferably pyrolysis is stopped by a quench injecting a quenching fluid, which in the Examples is water. A reactor suitable for use in producing the carbon blacks of the present invention is described generally in U.S. Pat. No. 3,922,335, the disclosure of which is hereby incorporated by reference. The process for preparing the novel carbon blacks of the present invention will be described in greater detail hereinafter.

The rubbers for which the novel carbon blacks of this invention are effective as reinforcing agents include natural and synthetic rubbers. Generally, amounts of the carbon black product ranging from about 10 to about 250 parts by weight can be used for each 100 parts by weight of rubber in order to impart a significant degree of reinforcement. It is, however, preferred to use amounts varying from about 20 to about 100 parts by weight of carbon black per 100 parts by weight of rubber and especially preferred is the utilization of from about 50 to about 100 parts of carbon black per 100 parts of rubber.

Among the rubbers suitable for use with the present invention are natural rubber and its derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjegated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene.

An advantage of the carbon blacks of the present invention is that the carbon blacks impart improved abrasion resistance, heterogeneous abrasion resistance and grip performance to compositions containing natural rubbers, synthetic rubbers or blends thereof in which the carbon blacks of the present invention are incorporated.

Another advantage of the carbon blacks of the present invention is that the carbon blacks of the present invention overcome the hardness problem encountered in rubber compositions incorporating generally known high structure carbon blacks.

A further advantage of the carbon blacks of the present invention is that the carbon blacks of the present invention overcome the mixing and dispersion problems encountered in the formation of rubber compositions utilizing generally known high surface area carbon blacks.

An advantage of the rubber compositions of the present invention is the that the rubber compositions are particularly well suited for use as vehicle tires, particularly racing tires.

Other advantages of the present invention will become apparent from the following more detailed description of the invention.

BRIEF DESCRIPTION OF THE DRAWINGS:

FIG. 2 is an example of a Stokes diameter distribution curve.

DETAILED DESCRIPTION OF THE INVENTION

Figure 1:
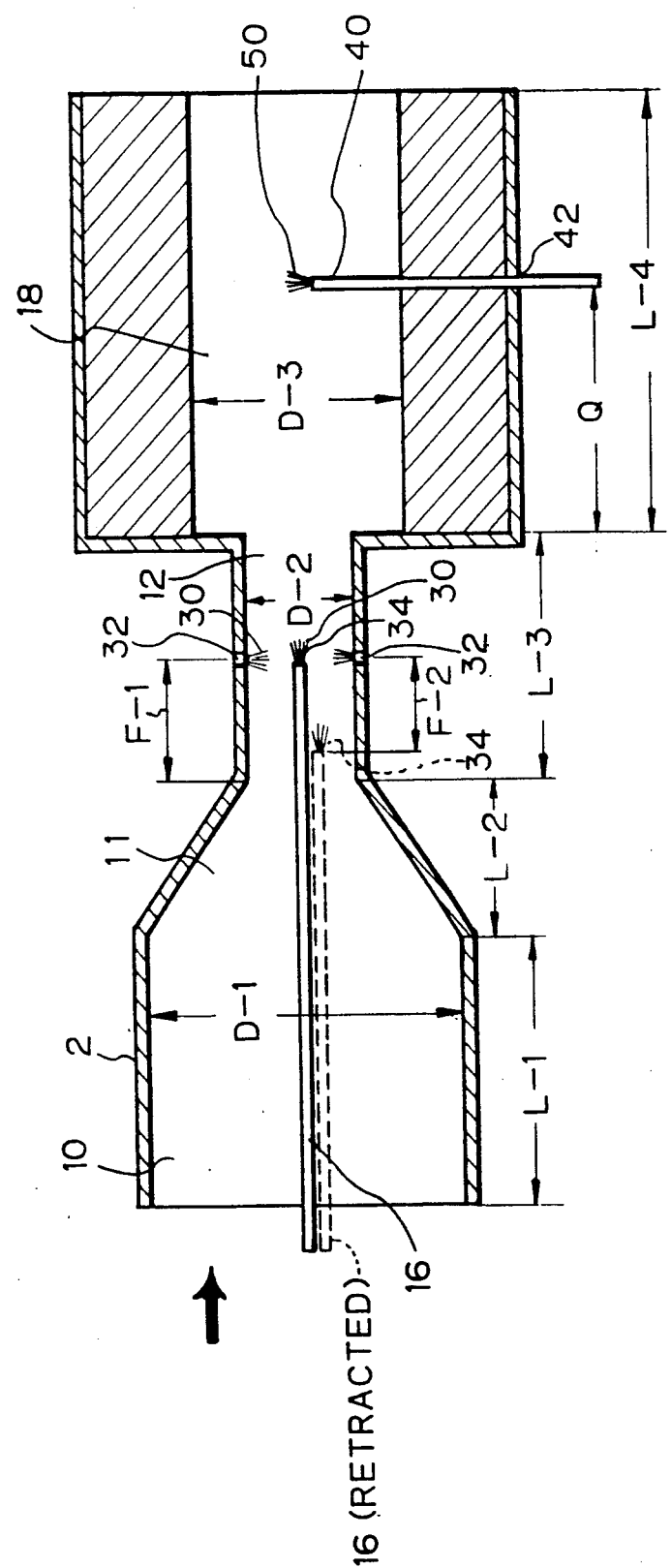
FIG. 1 is a cross-sectional view of a portion of one type of furnace carbon black reactor which may be utilized to produce the carbon blacks of the present invention.

The carbon blacks of the present invention are characterized by having a $N_2SA$ of from at least about 150 $m^2/g$ to about 180 $m^2/g$, a DBP of about 125 cc/100 g or less, preferably 100–125 cc/100 g, a Dmode of 70 nm or less, preferably 50–70 nm, a $N_2SA/I_2$ No. ratio of 0.85 to 0.98 and a /DBP less than 20 cc/100 g, preferably 10–20 cc/100 g.

The carbon blacks of the present invention may be produced in a modular, also referred to as "staged", furnace carbon black reactor. A section of a typical modular furnace carbon black reactor which may be utilized to produce the carbon blacks of the present invention is depicted in FIG. 1.

Referring to FIG. 1, the carbon blacks of the present invention may be produced in a furnace carbon black reactor 2, having a combustion zone 10, which has a zone of converging diameter 11; transition zone 12; and reaction zone 18. The diameter of the combustion zone, 10, up to the point where the zone of converging diameter, 11, begins is shown as D-1; the diameter of zone 12, as D-2; and the diameter of the reaction zone, 18, as D-3. The length of the combustion zone, 10, up to the point where the zone of converging diameter, 11, begins is shown as L-1; the length of the zone of converging diameter is shown as L-2; the length of the transition zone is shown as L-3; the length of the reaction zone, 18, is shown as L-4. The carbon blacks described in the examples were produced in a reactor where D-1 is 20.7 inches (52.5 centimeters); D-2 is 12.4 inches (31.5 centimeters); D-3 is 18 inches (45.7 centimeters); L-1 is 37.5 inches (95.3 centimeters); L-2 is 29.5 inches (74.9 centimeters); L-3 is 11.5 inches (29.2 centimeters); and L-4 is 48 inches (121.9 centimeters).

To produce the carbon blacks of the present invention hot combustion gases are generated in combustion zone 10 by burning a liquid or gaseous fuel with a suitable oxidant stream such as air, oxygen, mixtures of air and oxygen or the like. Generally the amount of air introduced is between about 1400 to 2100 $Nm^3/Hr$.

Among the fuels suitable for use in generating the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. To facilitate the generation of hot combustion gases, the oxidant stream may be preheated, such as to a temperature between 500° and 800° C.

The hot combustion gas stream flows downstream from zones 10 and 11 into zones 12 and then 18. The direction of the flow of hot combustion gases is shown in the figure by the arrow. Carbon black-yielding feedstock, 30, is introduced both at point 32 (located in zone 12) and simultaneously through probe, 16, at point 34. Generally the amount of feedstock introduced is between about 300 and 500 kg/hr.. The distance from the end of the zone of converging diameter to point 32, is shown as F-1. The distance from point 32 upstream to point 34, is shown as F-2. To produce the carbon blacks of the present invention, the feedstock may be injected in an amount of from about 80% to about 40% by weight, at point 32, and the remainder of the total amount of from about 20% to about 60% by weight, injected at point 34. Preferably from about 75% to about 60% of the total amount of feedstock, by weight, is introduced at point 32, and the remainder of the total amount of feedstock, from about 25% to about 40% by weight, is introduced at point 34. In the examples described herein carbon black-yielding feedstock, 30, was injected in the form of a plurality of jets which penetrate into the interior regions of the hot combustion gas stream to insure a high rate of mixing and shearing of the hot combustion gases and the carbon black-yielding feedstock so as to rapidly and completely decompose and convert the feedstock to the novel carbon blacks of the present invention.

The mixture of carbon black-yielding feedstock and hot combustion gases flows downstream through zone 12 into reaction zone 18. Quench 40, located at point 42, injecting water 50, is utilized to stop pyrolysis of the carbon black-yielding feedstock when the novel carbon blacks of the present invention are formed. Point 42 may be determined in any manner known to the art, for selecting the position of a quench to stop pyrolysis. One method for determining the position of the quench to stop pyrolysis is by determining the point at which an acceptable toluene extract level for the novel carbon blacks of the present invention is achieved Toluene extract level may be measured by using ASTM Test D1618-83 "Carbon Black Extractables—Toluene Discoloration". Q is the distance from the beginning of zone 18 to quench point 42, and will vary according to the position of the quench.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

The following testing procedures are used in the determination and evaluation of the analytical properties of the carbon blacks of the present invention, and the physical properties of the rubber compositions incorporating the carbon blacks of the present invention.

Nitrogen surface area of the carbon blacks ($N_2SA$) was determined according to ASTM D3037. Iodine adsorption number of the carbon blacks ($I_2No.$) was determined according to JIS K6221- 1982, in which, as a result of the high value of the I2No. of the carbon blacks of the present invention, the ratio of iodine solution to carbon black is 1:100. The DBP (Dibutyl Phthalate absorption value) of the carbon black pellets was determined according to the procedure set forth in JIS K6221-1982. The CDBP of the carbon black pellets was determined according to the procedure set forth in ASTM D 3493.

Dmode of the carbon blacks was determined in the following manner. A histogram is made of the Stokes diameter of the aggregates of the carbon black sample versus the relative frequency of their occurrence in a given sample. As shown in FIG. 2, a line (B) is drawn from the peak (A) of the histogram in a direction parallel to the Y axis, to and ending at the X-axis at point (C) of the histogram. The midpoint (F) of the resultant line (B) is determined and a line (G) is drawn through the midpoint (F) thereof parallel to the X-axis. Line (G) intersects the distribution curve of the histogram at two points D and E. The value of the Stokes diameter at the peak of the distribution curve (Point A in FIG. 2) is the Dmode value.

The data used to generate the histogram are determined by the use of a disk centrifuge such as the one manufactured by Joyce Loebl Co. Ltd. of Tyne and Wear, United Kingdom. The following procedure is a modification of the procedure described in the instruction manual of the Joyce Loebl disk centrifuge file reference DCF 4.008 published on Feb. 1, 1985, the teachings of which are hereby incorporated by reference, and was used in determining the data.

The procedure is as follows. 10 mg (milligrams) of a carbon black sample are weighed in a weighing vessel, then added to 50 cc of a solution of 10% absolute ethanol and 90% distilled water which is made 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, N.Y.

Prior to the disk centrifuge run the following data are entered into the computer which records the data from the disk centrifuge:

1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C.;
5. The density of the spin fluid, which in this instance is 0.9975 hg/cc at 23 degrees C.;
6. The disk speed, which in this instance is 8000 rpm;
7. The data sampling interval, which in this instance is 1 second.

The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density and rate of sedimentation as the non-spherical object. The customary units are expressed in nanometer diameters.

Mode (Dmode for reporting purposes)—The Stokes diameter at the point of the peak (Point A of FIG. 2 herein) of the distribution curve of Stokes diameter.

Median Stokes diameter—(Dst for reporting purposes) the point on the distribution curve of Stokes diameter where 50% by weight of the sample is either larger or smaller (Point H of FIG. 2 herein). It therefore represents the median value of the determination.

The rubber compositions described in the Examples were cured at 145° C. for 30 and 50 minutes. The abrasion data of the rubber compositions were determined using a Lambourn abrader. The test pieces had an outer diameter of 54.0 mm and a thickness of 12.7 mm. The emery wheel had an abrasive grain of C type, a grain size of #80 and a binding degree of K. The relative slip ratio between the Emery wheel surface and the test piece was evaluated at 25% and 60% slip levels. The 60% level of relative slip ratio is an kg. Ten (10) g/min of carborundum grain, grain size #100, was added. In the following examples, the abrasion index is the ratio of the abrasion rate of a control composition containing IRB #6 carbon black, divided by the abrasion rate of a composition produced using a specified carbon black of the present invention, at the same slip level.

The tangent loss (tan delta) of the rubber compositions was determined utilizing a visco-elastic spectrometer VES-S type made by Iwamoto Seisakusho Co.. The test piece of rubber had a length of 30 mm, a width of 5 mm and a thickness of 2 mm. The test was performed at 70° C., at a frequency of 10 Hz and a Deformation of 2%. The results obtained are indicated as an index relative to the value of IRB No. 6.

The effectiveness and advantages of the present invention will be further illustrated by the following examples.

EXAMPLES 1-5

Five examples of the novel carbon blacks of the present invention were prepared in three different carbon black production runs, in a reactor generally described herein, and as depicted in FIG. 1, utilizing the reactor conditions and geometry set forth in Table 2. The properties of the fuel oil utilized in the combustion reaction in each example, and the properties of the feedstock utilized in each example are shown in Table 1:

TABLE 1

|  | Fuel Oil | Feedstock Oil |
|---|---|---|
| Hydrogen/Carbon Ratio | 1.21 | 0.76 |
| Hydrogen (wt. %) | 9.22 | 5.89 |
| Carbon (wt. %) | 90.64 | 92.06 |
| Sulfur (wt. %) | 0.03 | 0.50 |
| BMCI (Visc-Grav) | 40 | 148 |
| A.P.I. Gravity 15.5/15.6 C(60)F [ASTM D-287] | 22.30 | −4.59 |
| Specific Gravity 15.5/15.6 C(60)F [ASTM D-287] | 0.920 | 1.115 |
| Viscosity, SUS (130° F.) [ASTM D-88] | 40 | 50 |
| Viscosity, SUS (210° F.) [ASTM D-88] | 33 | 40 |

TABLE 2

|  | CARBON BLACKS | | | | |
|---|---|---|---|---|---|
|  | Ex 1 | Ex 2 | Ex 3 | Ex 4 | Ex 5 |
| D-1, in. | 20.7 | 20.7 | 20.7 | 20.7 | 20.7 |
| D-2, in. | 12.4 | 12.4 | 12.4 | 12.4 | 12.4 |
| D-3, in. | 18.0 | 18.0 | 18.0 | 18.0 | 18.0 |
| L-1, in. | 37.5 | 37.5 | 37.5 | 37.5 | 37.5 |
| L-2, in. | 29.5 | 29.5 | 29.5 | 29.5 | 29.5 |
| L-3, in. | 11.5 | 11.5 | 11.5 | 11.5 | 11.5 |
| L-4, in. | 48.0 | 48.0 | 48.0 | 48.0 | 11.5 |
| F-1, in. | 5.75 | 5.75 | 5.75 | 5.75 | 5.75 |
| F-2, in. | 0.00 | 0.00 | 12.0 | 16.0 | 20.0 |
| Q, in. | 42 | 42 | 24 | 24 | 24 |
| Oil Inj. Pt. 32, Tips # × Size, in. | 12 × 0.0525 | 12 × 0.0525 | 12 × 0.0525 | 12 × 0.0525 | 12 × 0.0525 |
| Oil Rate Pt. 32, gph | 606 | 600 | 564 | 617 | 630 |
| Oil Press. Pt. 32, psig | 270 | 270 | 210 | 210 | 220 |
| Oil Preheat Pt. 32, °F. | 250 | 250 | 270 | 270 | 260 |
| Oil Inj. Pt. 34, Tips # × Size, in. | 6 × 0.0525 | 6 × 0.0525 | 6 × 0.0525 | 6 × 0.0525 | 6 × 0.0525 |

TABLE 2-continued

| | CARBON BLACKS | | | | |
|---|---|---|---|---|---|
| | Ex 1 | Ex 2 | Ex 3 | Ex 4 | Ex 5 |
| Oil Rate Pt. 34, gph | 324 | 250 | 220 | 220 | 210 |
| Oil Press. Pt. 34, psig | 270 | 280 | 210 | 230 | 220 |
| Oil Preheat Pt. 34, °F. | 250 | 250 | 270 | 270 | 260 |
| Comb. Air, kscfh | 600 | 600 | 600 | 600 | 600 |
| Comb. Air Preheat, °F. | 1240 | 1240 | 1240 | 1240 | 1240 |
| Fuel, gph | 338 | 340 | 340 | 340 | 330 |
| Air to Burn Ratio | 1.34 | 1.34 | 1.34 | 1.34 | 1.34 |
| Potassium, lb./hr. | 0.029 | 0.030 | 0.00 | 0.00 | 0.01 |
| Quench Press., psi | 220 | 220 | 230 | 230 | 230 |
| Temp. at Quench, °F. | 1560 | 1560 | 1560 | 1560 | 1560 |

Inj. = Injection; Comb. = combustion; Press. = pressure; Pt. 32 = Point 32 on FIG. 1; Pt. 34 = Point 34 on FIG. 1; gph = gallons per hour; psi = pounds per square inch kscfh = standard cubic feet per hour, in thousands; in. = inches; °F. = degrees Fahrenheit The carbon blacks produced in each run were then analyzed according to the procedures described herein. The analytical properties of the blacks produced in each run, four comparative example (C.E.) blacks, as well as an IRB #6 reference carbon black sample, were as shown in Table 3:

TABLE 3

| | Carbon Black | | | | | | | | | |
|---|---|---|---|---|---|---|---|---|---|---|
| | Ex 1 | Ex 2 | Ex 3 | Ex 4 | Ex 5 | CE 1 | CE 2 | CE 3 | CE 4 | IRB #6 |
| $N_2SA$ (m$^2$/g) | 165 | 167 | 177 | 174 | 167 | 144 | 170 | 172 | 145 | 76 |
| $I_2No$ (mg/g) | 177 | 176 | 181 | 181 | 171 | 146 | 172 | 172 | 143 | 80 |
| DBP (cc/100 g) | 117 | 119 | 120 | 124 | 116 | 116 | 135 | 120 | 113 | 100 |
| CDBP (cc/100 g) | 101 | 102 | 102 | 105 | 100 | 96 | 100 | 102 | 96 | 87 |
| Dmode (nm) | 67 | 68 | 70 | 70 | 68 | 70 | 66 | 74 | 72 | 110 |
| $N_2SA/I_2No$. | 0.93 | 0.95 | 0.98 | 0.96 | 0.98 | 0.99 | 0.99 | 1.00 | 1.01 | 0.95 |
| ΔDBP (cc/100 g) | 16 | 17 | 18 | 19 | 16 | 20 | 35 | 18 | 17 | 13 |

CE = comparative example carbon black

EXAMPLE 6

This Example illustrates the use of the novel carbon blacks of the present invention in synthetic rubber compositions.

Synthetic rubber compositions incorporating the novel carbon blacks of the present invention, the carbon blacks of the comparative examples and IRB #6 were prepared according to the recipe shown in Table 4.

TABLE 4

| SYNTHETIC RUBBER FORMULATION (ASTM D-3191-1985) | |
|---|---|
| Ingredient | Parts By Weight |
| SBR 1500 | 100.00 |
| Carbon Black | 50.00 |
| Zinc Oxide | 3.00 |
| Stearic Acid | 1.00 |
| Accelerator TBBS | 1.00 |
| Sulfur | 1.75 |

SBR = styrenebutadiene rubber
TBBS = N-tert-butyl-2-benzothiazolesulfenamide.

Each of the synthetic rubber compositions was cured at 145° C. for 30 minutes.

Rubber composition A was prepared with the carbon black of Example 1. Rubber composition B was prepared with the carbon black of Example 2. Rubber composition C was prepared with the carbon black of Example 3. Rubber composition D was prepared with the carbon black of Example 4. Rubber composition E was prepared with the carbon black of Example 5. Rubber composition F was prepared with the carbon black of comparative example 1. Rubber composition G was prepared with the carbon black of comparative example 2. Rubber composition H was prepared with the carbon black of comparative example 3. Rubber composition I was prepared with the carbon black of comparative example 4. Rubber composition J was prepared with IRB #6 carbon black.

The properties of the synthetic rubber compositions were then evaluated according to the procedures described herein. The results were as shown in Table 5:

TABLE 5

| Rubber Composition | Tan Delta Index % IRB 6 | Abrasion Index % IRB 6 25% Slip Ratio | Abrasion Index % IRB 6 60% Slip Ratio |
|---|---|---|---|
| A (Ex. 1) | 125 | 134 | 123 |
| B (Ex. 2) | 123 | 133 | 123 |
| C (Ex. 3) | 123 | 130 | 130 |
| D (Ex. 4) | 124 | 136 | 126 |
| E (Ex. 5) | 124 | 134 | 124 |
| F (C.E. 1) | 114 | 125 | 120 |
| G (C.E. 2) | 121 | 127 | 121 |
| H (C.E. 3) | 120 | 120 | 118 |
| I (C.E. 4) | 114 | 126 | 119 |
| J (IRB #6) | 100 | 100 | 100 |

These results show that the abrasion index (%IRB 6) at the 25% slip level of rubber compositions A, B, C, D and E, incorporating the carbon blacks of the present invention is higher than the abrasion index (%IRB 6) at the 25% slip level of rubber compositions F, G, H and I incorporating the comparative example carbon blacks. Thus rubber compositions A, B, C, D and E, incorporating the carbon blacks of the present invention have improved abrasion resistance in comparison with rubber compositions F, G, H and I incorporating the comparative example carbon blacks.

The results set forth in Table 5 also show that the abrasion index (%IRB 6) at the 60% slip level of rubber compositions A, B, C, D and E, incorporating the carbon blacks of the present invention is higher than the abrasion index (%IRB 6) at the 60% slip level of rubber compositions F, G, H and I incorporating the comparative example carbon blacks. Thus rubber compositions A, B, C, D and E, incorporating the carbon blacks of the present invention, have improved heterogeneous abrasion resistance in comparison with rubber compositions F, G, H and I incorporating the comparative example carbon blacks.

The results set forth in Table 5 further show that the tan delta index (%IRB 6) of rubber compositions A, B, C, D and E, incorporating the carbon blacks of the present invention is higher than the tan delta index (%IRB 6) of rubber compositions F, G, H and I incorporating the comparative example carbon blacks. Thus rubber compositions A, B, C, D and E, incorporating the carbon blacks of the present invention, have improved grip performance in comparison with rubber compositions F, G, H and I incorporating the comparative example carbon blacks.

It should be clearly understood that the forms of the present invention herein described are illustrative only and are not intended to limit the scope of the invention. The present invention includes all modifications falling within the scope of the following claims.

We claim:

1. Carbon blacks characterized by having a $N_2SA$ of from 150 m$^2$/g to 180 m$^2$/g, a DBP of 125 cc/100 g or less, a Dmode of 70 nm or less, a $N_2SA/I_2$ No. ratio of 0.85 to 0.98 and a $\Delta$DBP less than 20 cc/100 g.

2. The carbon black of claim 1 wherein the DBP of the carbon black is 100–125 cc/100 g, the Dmode of the carbon black is 50–70 nm, and the $\Delta$DBP of the carbon black is 10–20 cc/100 g.

3. A rubber composition comprising about 100 parts, by weight, of a rubber and from about 10 to about 250 parts, by weight, of a carbon black having a $N_2SA$ of from 150 m$^2$/g to 180 m$^2$/g, a DBP of 125 cc/100 g or less, a Dmode of 70 nm or less, a $N_2SA/I_2$ No. ratio of 0.85 to 0.98 and a $\Delta$DBP less than 20 cc/100 g.

4. The rubber composition of claim 3 wherein the DBP of the carbon black is 100–125 cc/100 g, the Dmode of the carbon black is 50–70 nm, and the $\Delta$DBP of the carbon black is 10–20 cc/100 g.

* * * * *

UNITED STATES PATENT AND TRADEMARK OFFICE
CERTIFICATE OF CORRECTION

PATENT NO. : 5,093,407
DATED : March 3, 1992
INVENTOR(S) : Yasumi Komai, Mizuo Soeda It is certified that error appears in the above-indentified patent and that said Letters Patent is hereby corrected as shown below:

ON THE TITLE PAGE

In the Abstract: line 4, "210" should read --20.

Signed and Sealed this

Twenty-ninth Day of June, 1993

Attest:

MICHAEL K. KIRK

Attesting Officer

Acting Commissioner of Patents and Trademarks